Nov. 22, 1966 A. MARZOCCHI 3,287,204
ELASTOMERIC-GLASS FIBER PRODUCTS AND PROCESS
AND ELEMENTS FOR USE IN SAME
Filed Aug. 22, 1962
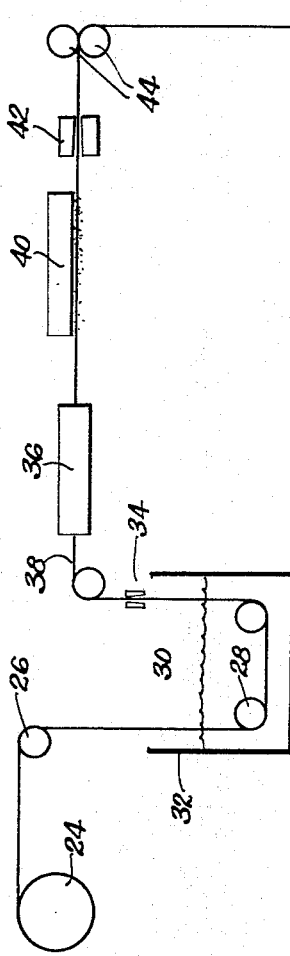
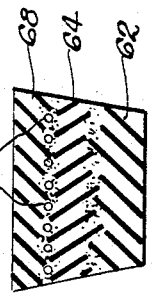
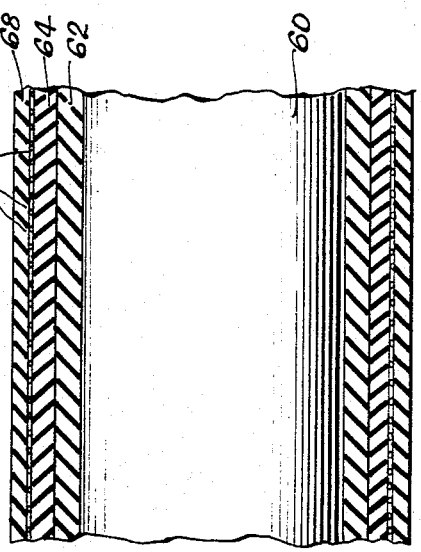
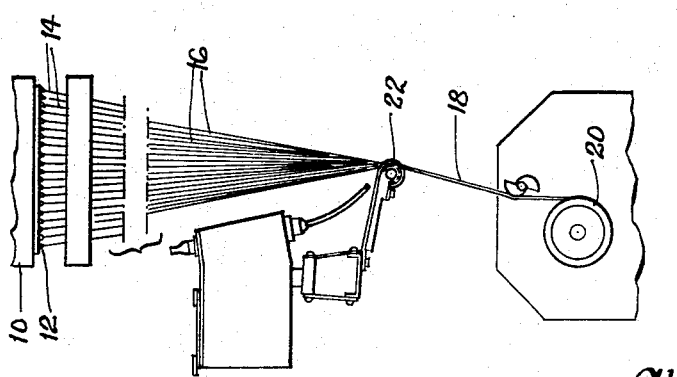
INVENTOR.
Alfred Marzocchi
BY
Staelin and Overman
Attys United States Patent Office 3,287,204
Patented Nov. 22, 1966

3,287,204
ELASTOMERIC-GLASS FIBER PRODUCTS AND PROCESS AND ELEMENTS FOR USE IN SAME
Alfred Marzocchi, Cumberland, R.I., assignor to Owens-Corning Fiberglas Corporation, a corporation of Delaware
Filed Aug. 22, 1962, Ser. No. 218,724
12 Claims. (Cl. 161—175)

This invention relates to rubber or elastomeric products reinforced with glass fibers and it relates more particularly to the method and means for improving the relationship between glass fibers and elastomeric materials whereby the resulting products are characterized by improved strength, flexibility and appearance, and the invention relates also to compositions and the improved products manufactured by the described method and means.

The invention is addressed to the fuller utilization of the desirable characteristics available from glass fibers such as their strength, their flexibility, their inertness and the like when employed in combinations with the elastomeric materials, such as natural or synthetic rubbers in the manufacture of rubber coated fibers, strands or yarns and fabrics formed thereof and rubber products in which the glass fibers are embedded in the elastomeric materials such as in belting, hose, tires and the like glass fiber, reinforced, elastomeric products.

It is an object of this invention to provide a means and method to improve the relationship between glass fibers, strands, yarns, cords and fabrics formed of glass fibers with elastomeric or rubber-like materials employed in combinations therewith whereby fuller utilization can be made of desirable properties of the glass fiber component in the glass fiber-elastomeric system.

More specifically, it is an object of this invention to provide materials, methods and means whereby a strong and permanent bonded relationship can be established and maintained between glass fibers and elastomeric materials employed in combinations with glass fibers in the manufacture of coated fibers and fabrics and rubber products; whereby glass fiber systems having improved strength and resistance to deterioration can be produced for use in combinations with elastomeric or rubber-like materials in the manufacture of improved glass fiber-elastomeric products; whereby separation at the interface between the glass fiber components and the matrix of elastomeric or rubber-like materials is substantially avoided thereby to enable more complete and uniform distribution of the glass fiber component in the elastomeric system for better utilization of the glass fibers, and for the fabrication of end products having new and improved characteristics, and whereby coated glass fibers can be made available as a product of manufacture for subsequent use in combinations with elastomeric materials in the manufacture of glass fiber-elastomeric products having new and improved characteristics, and it is a related object to produce new and improved glass fiber-elastomeric products.

These and other objects and advantages of this invention will hereinafter appear and for purposes of illustration, but not of limitation, an embodiment of the invention is shown in the accompanying drawings in which—

FIG. 1 is a flow diagram showing glass fiber manufacture and the treatment of the glass fibers in forming in accordance with the practice of this invention;

FIG. 2 is a flow diagram illustrating a subsequent step embodying a feature of this invention for impregnating a strand of glass fibers with elastomeric material to produce a glass fiber system as a product which is usable as an end product or as an intermediate product in the manufacture of glass fiber-elastomeric systems;

FIG. 3 is a schematic sectional view of the arrangement of materials in the manufacture of endless belting in accordance with the practice of this invention; and FIG. 4 is a cross-sectional view of a product fabricated in accordance with the practice of this invention and illustrating the relationship obtained between the glass fiber component and the elastomeric matrix.

To the present, glass fibers which have been added or otherwise incorporated with elastomeric materials have tended to function more as a filler than as a reinforcement, flexibilizing or stabilizing agent, with the result that little, if any, improvements in mechanical and physical properties have been made available from the combinations of glass fibers in products formed of such elastomeric materials. It is believed that the failure to make fuller utilization of some of the more desirable properties of the glass fiber component resides in the inability properly to integrate the glass fibers into the elastomeric system. As a result, the glass fibers function more as a filler than as a contributing factor in the properties of the cured, vulcanized, or other elastomeric product.

Investigations have been conducted for over the past twenty or more years by many skilled in the art in the attempt to make fuller utilization of the glass fiber component in systems formulated of elastomeric materials in the endeavor to produce products having new and improved physical and mechanical properties. Substantial inroads are now being made, as represented by the practice of this invention, as will hereinafter be described.

The invention will hereinafter be described with reference to the combination which makes use of endless lengths of glass fibers in the form of filaments, yarns and cords; an aminopropyltriethoxy silane as the anchoring agent, and neoprene as the elastomeric component to produce new and improved neoprene coated glass fibers which may be used as such in the fabrication of cords, rope, fabrics and the like, and the invention will be further described with reference to the use of such elastomeric coated glass fibers and the fabrication of improved endless belts thereof. It will be understood that the foregoing is to be used merely by way of illustration, and not by way of limitation, of the invention as will hereinafter appear since the glass fiber component may be employed in other forms, since other organic amino silanes may be used; since other natural or synthetic elastomeric materials may be employed, and finally since a large number of other glass fiber-elastomeric products may be produced.

As used herein, the term "elastomer" is meant to include, in addition to neoprene, such other synthetic elastomeric or rubber-like materials as butadiene, chloroprene, isoprene and the like, or copolymers thereof with acrylonitrile, styrene and the like, and especially those elastomeric materials which are curable or vulcanizable by reaction to a set stage by peroxide or through sulphur linkages, and the term is also meant to include natural rubbers and modifications thereof, such as chlorinated rubber and the like.

While the term "glass fibers" is preferably employed to define continuous glass fibers in the form of filaments, strands, yarns, bundles, cords and fabrics formed thereof, it is intended also to include discontinuous glass fibers in the form of glass wool fibers and yarns and fabrics formed thereof, or fibers of the continuous of discontinuous types which have been cut, chopped or otherwise reduced to shorter lengths but to lengths greater than about ⅛ inch.

EXAMPLE 1

Preparation of treated glass fibers:
In FIG. 1 of the drawings, schematic illustration is made of a means for the production of endless lengths of glass fibers including a glass melting furnace 10 having a bushing 12 on the bottom side thereof provided with a plurality of openings. The streams 14 of molten glass, flowing gravitationally from the openings in the bushing at the bottom side of the furnace, are rapidly attenuated into fine filaments 16 by winding the filaments, after they have been gathered together to form a strand 18, about a rapidly rotating winding drum 20.

The separate filaments are coated as they are gathered together into a single bundle or strand. For this purpose, use is made of an applicator 22 which may be in the form of a wiping pad wet with the fluid treating composition embodying one of the features of this invention and over which the glass fiber filaments, in forming, are passed as they are gathered together to form the strand 18 that is wound about the winding drum 20.

The composition applied to the glass fibers in forming is formulated to contain gamma-aminopropyltriethoxy silane as a component thereof. The gamma-aminopropyltriethoxy silane may be applied alone in solution in a suitable volatilizable carrier, as illustrated by Compositions A and B, but it is preferred to embody the anchoring agent as an essential component in a conventional size composition and preferably in a size composition represented by the formulation of Compositions C and D. When employed in a treating composition formulated to contain the gamma-aminopropyltriethoxy silane alone, as in Compositions A or B, or in combination with a suitable film forming material and lubricant, as in Compositions C and D, it is desirable to make use of a composition containing the anchoring agent in an amount within the range of 0.1 to 5.0 percent by weight and preferably in an amount within the range of 0.5 to 2.0 percent by weight. The following compositions are given by way of illustration of treating compositions which may be employed in this phase of practice of this invention.

*Composition A*

0.5–5.0 percent by weight gamma-aminopropyl-triethoxy silane
Remainder water

*Composition B*

0.5–5.0 percent by weight gamma-aminopropyl-trietoxy saline
0.3–0.6 percent by weight glycerine
Remainder water

*Composition C*

8.0 percent by weight partially dextrinized starch
1.8 percent by weight hydrogenated vegetable oil
0.4 percent by weight cationic wetting agent (lauryl amine acetate)
0.2 percent by weight non-ionic emulsifying agent
1.0 percent by weight gamma-aminopropyltriethoxy silane

*Composition D*

3.2 percent by weight polyester resin
0.1 percent by weight Nopcogen 16 L
0.1 percent by weight Triton X–100
0.1 percent by weight polyvinyl alcohol
3.0 percent by weight polyvinyl pyrrolidone
0.3 percent by weight gamma-aminopropyltriethoxy silane
0.1 percent by weight acetic acid
93.2 percent by weight water In the foregoing examples of glass fiber treating Compositions A to D, the gamma-aminopropyltriethoxy silane can be replaced, in whole or in part, with an equivalent amount of gamma-aminopropylvinyldiethoxy silane, gamma(triethoxysilylpropylamide)propyl amine, N(gamma-triethoxysilylpropyl)propylamine, gamma(triethoxysilylpropyloxy)propylamine, beta-aminoallyltriethoxy silane, para-aminophenyltriethoxy silane, aniline silane derivatives, and other amino silane compounds or organo silicon compounds formed of a silane having at least one but not more than three hydrolyzable groups and having an organic group attached directly or through an oxygen group to the silicon atom containing less than 8 carbon atoms and also containing a free amine group. While such other amino silanes or unsaturated amino salines can be used, the results secured from the formulations containing gamma-aminotriethoxy silane would indicate that the latter is in a class of its own from the standpoint of the improvements that are secured from the combinations of the treated glass fibers with elastomeric materials, although substantial improvements are secured by the use of such other anchoring agents in the compositions described.

When the treated glass fibers are subsequently to be processed into yarns, cords and fabrics, it is preferred to make use of a composition in which the anchoring agent is embodied as a component in a glass fiber forming size, such as in Composition C or D, thereby to provide the glass fibers with a coating which enhances the processing as well as the performance characteristics to enable the glass fibers to be formed into such yarns, cords and fabrics and also permitting the treated glass fibers to be used as a reinforcement in combination with the elastomeric materials without previously removing the protective size composition for replacement with the anchoring agent. If the fibers are to be used directly in combination with an elastomeric material, or when the fibers are treated after the fibers have been processed into yarns or fabrics and the size originally applied has been removed, then compositions of the type illustrated by Compositions A and B will be preferred.

Instead of wiping the treating composition onto the glass fibers, the treating composition can be applied by other conventional coating means and methods, such as by spray coating, roller coating, flow coating and the like. It is preferred to apply the composition directly onto bare glass fibers, as in the described forming operation, or after the original size has been removed, after the glass fibers have been otherwise sized and processed into yarns or fabrics.

Treating of the glass fibers in forming, in accordance with the preferred practice of this invention, with Composition D, results in a treated glass fiber which has low ignition loss and in which the filaments of glass fibers making up the strand are capable of easy separation to enable fuller penetration of the strand of glass fibers in the subsequent treatment to impregnate the strand or to coat the fibers with neoprene to produce the neoprene coated strand of glass fibers. It also gives a strand to which the rubber or elastomeric compound can strongly adhere.

The glass fibers, coated in accordance with Example 1, can be dried at elevated temperature but, it is the usual practice to allow the sized or coated glass fibers to air dry. The dried strands of glass fibers can be used as such, or cut to shorter lengths, for combinations with the elastomeric materials, or the fibers can be processed into yarns, twisted into cords and/or woven into fabrics for subsequent combination with the elastomeric material in the manufacture of elastomeric coated glass fiber fabrics or glass fiber reinforced molded or laminated elastomeric products.

The foregoing embodies the invention described and claimed in the copending application filed concurrently herewith in the names of Alfred Marzocchi and Nicholas S. Janetos as inventors, and entitled "Elastomeric-Glass Fiber Products and Process and Elements for Use in Same." This invention is addressed to the concept wherein the glass fibers, treated in accordance with Example 1, are further coated, as illustrated by the following Example 2, to provide an overcoat of neoprene or other elastomeric material in an uncured or preferably in an intermediate stage of cure or vulcanization.

EXAMPLE 2

Preparation of rubber coated glass fibers:

Before entering into a discussion of the coating of the treated glass fibers, illustration will first be made of suitable rubber coating compositions which may be employed in the further practice of this invention.

Composition E 100 parts by weight Neoprene W
4 parts by weight magnesium oxide
5 parts by weight zinc oxide
15 parts by weight Channel Black
1 part by weight Thiate B (trialkyl thiourea accelerator for neoprene)

Composition F 100 parts by weight Paracril C
25 parts by weight SRF Black
5 parts by weight zinc oxide
0.5 parts by weight Aminox (reaction product of diphenyl amine acetone product)
1 part by weight stearic acid
40 parts by weight dicumyl peroxide Referring now to FIG. 2 of the drawings, the treated strands 18 of glass fibers are unwound from the spool 24 and advanced continuously over rollers 26 and 28 into a bath 30 of treating Composition E or F housed in a container 32. From the container, the strand of glass fibers, impregnated with the treating material of the bath passes upwardly through a wiping die 34 whereby excess composition is removed from the impregnated glass fiber yarn and wherein the treating composition can be worked into the yarn to coat the surfaces of the interior fibers.

The yarn, impregnated with the composition, is advanced continuously from the die 34 through a drying oven 36 maintained at an elevated temperature, such as at about 400° F., sufficient to remove the diluent from the applied coating composition and to advance the cure or vulcanization of the elastomeric material in the coating to a stage less than the fully cured or vulcanized stage.

From the drying oven 36, the impregnated strand 38 of glass fibers, having the elastomeric material anchored to the glass fiber surfaces through the previously applied anchoring agent, is advanced through a shaker device 40 for the application of zinc stearate in dry powder form to the surfaces thereof and then through a suitable wiping device 42 for the removal of excess. The endless strand of glass fibers is drawn through the processing steps described by means of power actuated pull rollers 44 positioned operatively to engage the rubber coated and impregnated strand of glass fibers.

The strand of glass fibers can be processed through conventional twisting devices, illustrated by the numeral 46, to introduced additional twists into the strand and/or it can be processed through conventional cording devices to produce cords or plies of the glass fiber yarn. In the twisting operation, a number of twists, such as eight twists per inch, can be introduced or it is possible in the twisting operation to bring together a number of ends, such as three ends or nine ends, with or without subsequent plying in the preparation of cord. In the operation to form cord out of the plain or twisted yarns of glass fibers, the cord may be formed as 1-3 ply or as 1-9 ply, or as 1-9-3 ply, the latter of which is preferred in a cording operation with the treated and coated glass fibers of this invention.

It is desirable in the process of the foregoing examples to achieve as complete impregnation of the strand or bundle of glass fibers as it is possible to achieve. Under such circumstances, the tremendous amount of surface area defined between the individual glass fiber filaments and the coating of elastomeric material will contribute frictional resistance to relative movements in such large proportions as to militate against slippage between the coating of the elastomeric material and the glass fibers. This additional resistance to relative movement would operate in addition to the improved bonding relationship that is established between the elastomeric coating and the glass fiber surfaces, which is achieved in accordance with the practice of this invention, by the presence of the anchoring agent in the coating previously applied to the surfaces of the glass fibers. Thus the fibers will be in a position markedly to influence the physical and mechanical properties of the elastomeric system and to provide exceptionally good reinforcement in the elastomeric product. The frictional relationship described is still further assisted by the twist and/or the ply subsequently introduced into the glass fiber structure thereby to militate against slippage of the fiber within the elastomeric sheath.

As previously pointed out the forming size composition D is one that is exceptionally well adapted for opening of the strand or bundle of glass fibers to allow more complete impregnation whereby an improved glass fiber-elastomeric coated strand, yarn, cord or fabric can be secured. Impregnation or coating with the elastomeric treating composition can be improved by the technique of flexing or bending of the strand or bundle of glass fibers while in the bath of the treating material or while wet with the treating composition, as by running the strand or bundle over bars or other flexing or bending devices. Instead, or in combination therewith, impregnation can be enhanced by the use of pressure dies or by passage of the glass fiber bundle through dies which provide for pulsations between high and low pressures that work the composition into the bundle while withdrawing occluded gases, or by passage of the strand or bundle of glass fibers wet with the composition through a series of dies for alternately constricting and flexing the strand to open the bundle, or by the techniques of ultrasonic vibrations during impregnation.

It will be understood that the impregnated strand of glass fibers can be employed as a product of manufacture or as an intermediate in the combination with an elastomeric matrix, without twisting or plying or cording, or with other amounts of twist and/or plying to form yarns or cords.

In the construction that is formed by the practice of Example 2, the fibers are cushioned one from the other by the elastomeric material. This permits high flexure while at the same time minimizing deterioration or destruction of the fibers by mutual abrasion and it makes it possible for the fibers individually to contribute strength, dimensional stability, inertness, and lack of fatigue to the elastomeric product. At the same time, the fibers can shift sufficiently within the system to bring more of the fibers into alignment thereby to resist tearing or rupture of the glass fiber reinforced product and thereby markedly to increase its tensile and bursting strength.

When the fibers, impregnated or coated with the composition of Example 2, are to be used as an end product in the form of a strand, yarn, or textile, or molded material formed thereof, the elastomeric component can be advanced to the cured or vulcanized state. However, when the product is to be employed as a component in combination with a matrix of elastomeric materials, as in the manufacture of coated fabrics, belting, tubing, tires, laminates, or other glass fiber reinforced elastomeric products, then it is desirable that the elastomeric component of the coating remain at some stage short of the wholly vulcanized or cured state so as to be able to blend or otherwise integrate the elastomer coating the fibers with the elastomer of the matrix during the subsequent cure or vulcanization to produce the elastomeric product.

In such instances when the elastomeric coated glass fiber strands, yarns, cords or fabrics of Example 2 are to be combined with an elastomeric matrix, it is desirable, and not essential, to overcoat the coated fibers with an agent, such as one of the anchoring agents previously described in connection with Example 1 and preferably gamma-aminopropyltriethoxy silane. Instead, for such overcoating which operates to enhance the integration between the rubber coated glass fibers and the rubber matrix whereby demarcations at the interface are substantially eliminated, use can be made of isocyanates suuch as phenolic bonded isocyanates or ethylenedimethacrylate.

The treated glass fibers can be embodied in any arrangement desired in a matrix of elastomeric materials in the manufacture of glass fiber-elestomeric products. With the glass fiber component covered with elastomeric material as a result of the process in accordance with the teachings of Example 2, the individual glass fibers are capable of being incorporated with the matrix of elastomeric material with little, if any, demarcation between the elastomeric coating on the glass fibers and the elastomer of the matrix thereby to achieve substantially complete unification with the glass fibers substantially uniformly dispersed throughout the section of the rubber matrix without identification of the form in which the fibers were incorporated as distinguished from the usual concentration of fibers in the bundle form as heretofore experienced.

The concepts embodying this phase of the invention will be described with reference to the use of the elastomeric coated strands, yarns or cords of Example 2 in the manufacture of a belting formed of elastomeric material. It will be understood, however, that other combinations with the elastomeric coated fibers and a matrix of elastomeric material can be secured in the fabrication of other elastomeric-glass fiber products which will be characterized by high strength, good flexure, good dimensional stability, relative inertness, high temperature resistance, high porosity strength, lack of fatigue, and the like.

EXAMPLE 3

Fabrication of endless driving belts:

In the manufacture of belting by the process of this invention, a belt forming mandrel 60 is first wrapped with a layer of neoprene rubber, hereinafter referred to as a cushion coat 62. Over the cushion coat another layer 64 of a lesser loaded neoprene rubber is wrapped to provide what is hereinafter referred to as an adhesion coat 64. Then the cords or strands of rubber coated glass fibers 66 are wrapped around the adhesion coat with or without previous coating of the surface of the adhesion coat with a tacky rubber cement to hold down the cords and to minimize shifting of the cords from a predetermined wrapped position thereby to permit more precise placement of the fibers in the final assembly. Over the layer of rubber coated glass fiber strands, yarns or cords 66, another cushion coat 68 of neoprene is wrapped to form the completed assembly.

The multiple layers of materials wrapped about the tube forming mandrel are then sliced circumferentially in substantially parallel relationship with the glass fibers to form laterally separated strips. The strips are removed by collapsing the mold.

First the strips are "skived" or cut to V shape in the fabrication of a V belt. Thereafter the strip is "flipped" by wrapping the V cut strip with a rubber impregnated fabric. The V shaped belt can be formed directly without the skiving step and/or without the flipping step, as by molding directly under heat and pressure in a mold of V shape in cross-section.

Vulcanization of the assembly is carried out in the mold at a temperature of about 3500 F. under positive pressure.

In the final product, illustrated by the cross-sectional view in FIG. 4, it will be seen that there is no clear line of demarcation between the rubber of the coating and the rubber of the matrix and that the fibers are no longer arranged in the bundle form in which they were originally incorporated but instead are spread out more or less uniformly across the section in which the fibers have been incorporated in the assembly.

Instead of making use of parallel wound strands or cords or yarns of elastomeric coated fibers, use can be made of single fibers or single strands of fibers as the fiber reinforcing component in the elastomeric system. Instead of locating the fibers in a single layer between the adhesion coat 64 and the outer cushion coat 68, the rubber coated glass component can be plied or incorporated as a wrapping or otherwise between other layers of the assembled elastomeric materials thereby to achieve uniform distribution of the reinforcing glass fibers in thickness as well as crosswise throughout the cross-section of the fabricated glass fiber-elestomeric structure.

In a preferred practice, chopped glass fibers, pretreated in the manner described, are incorporated into the composition forming the cushion coat, preferably with a majority of the glass fibers having their lengths running at right angles with the cords of fibers in the reinforcement. This operates materially to increase the modulus of the cushion coat and imparts greater flexibility when the belt is bent around the pulley. Such chopped or cut glass fibers can be added, as described, to the cushion coat to form a part thereof or laid down with the cushion coat during laying of various of the layers in the fabrication of the belt.

It will be understood that the described assembly of elastomeric materials and glass fibers and structures formed thereof can be achieved by the use of glass fibers of Example 1 or other glass fibers coated with an anchoring agent without the separate rubber coating previously applied in accordance with Example 2. Under such circumstances, the coating rubber would be received by the glass fibers while on the mandrel to effect advancement and cure during the final molding operation.

As previously pointed out, the neoprene used to coat the fibers in Example 2 or to form the matrix in Example 3 may be replaced by other natural or synthetic elastomeric materials of the type previously set forth.

In the system described, using an acrylonitrile elastomeric compound or rubber coated glass fibers and a matrix formed of same or neoprene, best use is made of a cure or vulcanization catalyst in the form of a peroxide catalyst for cure or vulcanization of the neoprene while in combination with the glass fibers. By way of example, use can be made of dicummyl peroxide, or other peroxide catalyst.

The resulting separation of the glass fiber filaments in the molded elastomeric product removes the possibilities of destruction of the fibers or loss of strength by mutual abrasion. Thus a product characterized by greater flexibility and strength is secured.

The combination of elastomeric material and glass fibers tied into the elastomeric material in substantially separated relation permits some degree of elongation of the formed product as well as some degree of compressibility whereby a large increase in strength can be experienced. For example, glass fiber yarns having a tensile strength of 225,000 p.s.i. are increased in strength to as much as 400,000 p.s.i. by loading in the manner described in accordance with Example 2. The small amount of stretch and compressibility available in the final product operates to enable the alignment of fibers in the product to resist rupture with corresponding increase in actual tensile strength.

It will be apparent from the foregoing that I have provided a new and improved method, means and materials for the production of glass fiber-elastomeric systems whereby marked improvements are secured in the end products from the standpoint of many of their physical, mechanical and chemical properties.

It will be understood that changes may be made in the details of construction, formulation and methods of application without departing from the spirit of the invention, especially as defined in the following claims.

I claim:

1. In the method of producing glass fiber-elastomeric products having improved mechanical and physical properties, the steps of treating the glass fibers to coat the fibers with an organo silicon compound formed of a silane having from 1 to 3 highly hydrolyzable groups and an organic group attached directly or through an oxygen group to the silicon atom containing an amine, gathering a plurality of the coated glass fibers into a glass fiber bundle, impregnating the glass fiber bundle with an elastomeric material and coating the elastomeric coated glass fibers with an interfacial bonding agent which serves to integrate the elastomeric material forming the matrix of the product with the elastomeric material present as a coating on the glass fiber surfaces during molding of the glass fiber-elastomeric system to the cured stage.

2. The method as claimed in claim 1 in which the interfacial bonding agent is an organo silicon compound comprising a silane having from 1 to 3 highly hydrolyzable groups and an organic group attached to the silicon atom containing a group selected from the group consisting of an amine and an unsaturated ethylenic group.

3. The method as claimed in claim 1 in which the interfacial bonding agent comprises isocyanate.

4. The method as claimed in claim 1 in which the interfacial bonding agent comprises a phenolic end blocked isocyanate.

5. The method as claimed in claim 1 in which the interfacial bonding agent comprises ethylenedimethacrylate.

6. The method as claimed in claim 1 in which the elastomeric material comprises neoprene.

7. The method as claimed in claim 1 in which the organo silicon compound comprises gamma-aminopropyltriethoxy silane.

8. In the method of producing glass fiber-elastomeric products having improved mechanical and physical properties, the steps of treating the glass fibers to coat the fibers with an anchoring agent for integrating an elastomeric material with the glass fiber surfaces, gathering the coated glass fibers into a glass fiber bundle, impregnating the glass fiber bundle with an elastomeric material substantially to coat the individual fibers, heating the elastomeric impregnated glass fiber bundle to advance the cure of the elastomeric material to a stage less than the fully cured stage, coating the elastomeric impregnated bundle of glass fibers with an interfacial binding agent for integration of the elastomer of the matrix of the product with the elastomer impregnating the bundle of glass fibers, combining the elastomeric coated glass fibers with the elastomeric material forming the matrix of the product in an uncured stage, and molding the material under heat and pressure to advance the elastomeric materials to the substantially cured stage in forming the glass fiber-elastomeric product.

9. The method as claimed in claim 8 in which the bundle of glass fibers coated with the elastomeric material are twisted to form a yarn prior to the combination with the elastomeric material.

10. The method as claimed in claim 8 in which the yarns of glass fibers are plied to form cords for combination with the elastomeric material forming the matrix.

11. The method as claimed in claim 8 in which the elastomeric materials of the coating and the matrix contain a peroxide catalyst for advancement to the cured stage.

12. A glass fiber reinforcement for elastomeric-glass fiber products comprising a bundle formed of a plurality of glass fibers, a first coating on the individual glass fiber surfaces containing an anchoring agent for integrating an elastomeric material with the glass fiber surfaces, an elastomeric composition impregnating the bundle of glass fibers coated with the anchoring agent substantially to coat the individual glass fibers with a second coating and a third coating in the form of an interfacial bonding agent on the impregnated bundle of glass fibers for integrating the elastomer of the product with the elastomeric material impregnating the bundle of glass fibers.

References Cited by the Examiner
UNITED STATES PATENTS

| | | | |
|---|---|---|---|
| 2,360,946 | 10/1944 | Hershberger | 156—137 X |
| 2,456,580 | 12/1948 | Carter et al. | 156—173 X |
| 3,022,196 | 2/1962 | Jenkins et al. | 156—329 X |
| 3,061,567 | 10/1962 | Keil | 156—329 X |
| 3,062,242 | 11/1962 | Vanderbilt | 138—141 |
| 3,074,903 | 1/1963 | Fincke et al. | 156—329 X |
| 3,085,903 | 4/1963 | Bemmels et al. | |
| 3,168,389 | 2/1965 | Eilerman | 156—329 X |

EARL M. BERGERT, *Primary Examiner.*

P. R. WYLIE, J. F. MATHEWS, J. P. MELOCHE,
*Assistant Examiners.*